United States Patent
Oikawa et al.

(10) Patent No.: US 8,527,981 B2
(45) Date of Patent: Sep. 3, 2013

(54) STORAGE DEVICE AND METHOD OF INSTRUCTING TO UPDATE FIRMWARE

(75) Inventors: Yoshihiro Oikawa, Kaisei (JP); Akio Nakajima, Yokohama (JP); Ikuya Yagisawa, Machida (JP)

(73) Assignee: Hitachi, Ltd., Tokyo (JP)

( * ) Notice: Subject to any disclaimer, the term of this patent is extended or adjusted under 35 U.S.C. 154(b) by 1287 days.

(21) Appl. No.: 12/289,263

(22) Filed: Oct. 23, 2008

(65) Prior Publication Data

US 2010/0058322 A1 Mar. 4, 2010

(30) Foreign Application Priority Data

Sep. 2, 2008 (JP) .................................. 2008-224962

(51) Int. Cl.
*G06F 9/44* (2006.01)
*G06F 9/445* (2006.01)

(52) U.S. Cl.
USPC ............ 717/173; 717/168; 717/174; 717/178

(58) Field of Classification Search
None
See application file for complete search history.

(56) References Cited

U.S. PATENT DOCUMENTS

| | | | |
|---|---|---|---|
| 5,121,480 A | 6/1992 | Bonke et al. | |
| 6,237,091 B1 | 5/2001 | Firooz et al. | |
| 7,111,158 B1 | 9/2006 | Burroughs et al. | |
| 7,496,700 B1 | 2/2009 | Chong et al. | |
| 7,876,469 B2 * | 1/2011 | Hanada | 717/174 |
| 7,979,595 B2 * | 7/2011 | Miyamoto | 717/168 |
| 8,250,567 B2 * | 8/2012 | Gesquiere et al. | 717/173 |
| 2004/0078707 A1 | 4/2004 | Apperley et al. | |
| 2004/0194081 A1 * | 9/2004 | Qumei et al. | 717/173 |
| 2004/0243997 A1 * | 12/2004 | Mullen et al. | 717/174 |
| 2005/0144609 A1 * | 6/2005 | Rothman et al. | 717/168 |
| 2005/0186832 A1 | 8/2005 | Nemazie | |
| 2005/0251588 A1 | 11/2005 | Hoch et al. | |
| 2007/0006217 A1 * | 1/2007 | Tammana | 717/174 |

(Continued)

FOREIGN PATENT DOCUMENTS

| | | |
|---|---|---|
| JP | 2000-148465 | 10/1999 |
| JP | 2008-46791 | 8/2006 |

OTHER PUBLICATIONS

Texas Instruments; Wireless Sensor Monitor Using the eZ430-RF2500; [Dec. 2007]; retrieved online on Jun. 6, 2013;pp. 1-22; Retrieved from Internet: <URL: http://www.ti.com/lit/an/slaa378d/slaa378d.pdf>.*

(Continued)

*Primary Examiner* — Thuy Dao
*Assistant Examiner* — Hanh T Bui
(74) *Attorney, Agent, or Firm* — Stites & Harbison PLLC; Juan Carlos A. Marquez, Esq.; Nicholas B. Trenkle, Esq.

(57) ABSTRACT

A storage device includes a plurality of expanders connected to a disk device and a controller unit for controlling the expanders. The disk device stores data transmitted from a host device. The controller determines whether, when download data is received from a predetermined terminal to update firmware of an expander, it is necessary to initialize a corresponding expander after downloading the download data by the expander, transmits determined initialization determining information determined to the terminal, transmits the download data to the corresponding expander, and instructs the corresponding expander to update the firmware at a timing for updating the firmware, which is determined by the terminal based on the initialization determining information.

12 Claims, 17 Drawing Sheets

(56) References Cited

U.S. PATENT DOCUMENTS

| | | | |
|---|---|---|---|
| 2007/0169079 A1* | 7/2007 | Keller et al. | 717/168 |
| 2007/0169095 A1* | 7/2007 | Chien et al. | 717/168 |
| 2008/0022041 A1 | 1/2008 | Nakajima | |
| 2008/0040818 A1 | 2/2008 | Iima et al. | |
| 2010/0058322 A1 | 3/2010 | Oikawa et al. | |
| 2010/0122246 A1* | 5/2010 | Gesquiere et al. | 717/173 |
| 2011/0126192 A1* | 5/2011 | Frost et al. | 717/178 |

OTHER PUBLICATIONS

Lakshmi N. Bairavasundaram et al.; An Analysis of Data Corruption in the Storage Stack; [Nov. 2008]; retrieved online on Jun. 6, 2006; pp. 1-28; Retrieved from the Internet: <URL: http://delivery.acm.org/10.1145/1420000/1416947/a8-bairavasundaram.pdf?>.*

Congfu Bi et al.; Implementation of Embedded EOS Communication Terminal; [Jun. 2008]; retrieved online on Jun. 6, 2013; pp. 4201-4205; Retrieved from the Internet: <URL: http://ieeexplore.ieee.org/stamp/stamp.jsp?tp=&arnumber=4593597>.*

Information Technology—AT Attachment-8, ATA Serial Transport (ATA8-AST), "Working Draft American National Standard for Information and Technology, Project 1697D, Section 10, Serial Transport error handling, T13/1697D Revision Ob", American National Standards Institute, Jun. 16, 2005, pp. 240-249.

* cited by examiner

| TIME | PATH | DRIVER | IOPS |
|---|---|---|---|
| 00000000 | 0 | 0 | 1000 |
| 00000000 | 1 | 1 | 1000 |
| 54000 | 0 | 0 | 0 |
| 54000 | 0 | 1 | 0 |
| ⋮ | ⋮ | ⋮ | ⋮ |
| 54000 | 0 | 14 | 0 |
| ⋮ | ⋮ | ⋮ | ⋮ |
| 2073599 | 1 | 1000 | 1000 |
| 69A | 69B | 69C | 69D |

STORAGE DEVICE AND METHOD OF INSTRUCTING TO UPDATE FIRMWARE

CROSS REFERENCES TO RELATED APPLICATIONS

This application relates to and claims priority from Japanese Patent Application No. 2008-224962, filed on Sep. 2, 2008, the entire disclosure of which is incorporated herein by reference.

BACKGROUND OF THE INVENTION

1. Technical Field

The present invention relates to a storage device and a method of instructing to update firmware, and it is, for example, preferably applicable to a storage device for instructing the firmware of an expander to update.

2. Related Art

Conventionally, in an expander serving as a drive I/F (interface) of a storage device, it is necessary for the expander to be rebooted and initialized after updating firmware.

For example, in Patent Document 1, information on states and configurations is stored to another region of a memory, which is not affected by the update of firmware. Further, information which may change during the update of firmware is necessary to secure not to change is stored to another region in the memory, which is not affected by the update of firmware.

In addition, in Patent Document 2, when receiving a update request for the firmware from the host, the storage device informs the host device of a update completion at the time when a new firmware transmitted from the host device is received and stored in a backup memory, and after informing of the update completion, the new firmware is written and updated in a volatile memory and the like by a background process using free time in processing a command issued from the host device.

[Patent Document 1] Japanese Unexamined Patent Application Publication No. 2000-148465
[Patent Document 2] Japanese Unexamined Patent Application Publication No. 2008-046791

However, during a predetermined period of time after download data of the firmware is downloaded, transmission/reception of I/O (Input/Output) data is stopped in a storage device having no redundancy, and transmission/reception performance of I/O data is reduced by half or the redundancy is disappeared in a storage device having redundancy. That is, there is some fear that the transmission/reception of I/O data is not performed temporarily or the transmission/reception performance of I/O data is deteriorated.

SUMMARY

The present invention has been made in the above circumstances, and provides a storage device and a method of instructing to update the firmware, which can increase the speed of transmission/reception of data and reliability thereof.

According to an aspect of the present invention, there is provided a storage device including: a plurality of expanders connected to a disk device which stores data transmitted from a host device; and a controller unit for controlling the expander, wherein the controller unit includes a determination unit for determining whether or not, when download data is received from a predetermined terminal in order to update firmware of the expander, it is necessary to initialize a corresponding expander after downloading the download data by the expander, a transmission unit for transmitting initialization determining information determined by the determination unit to the terminal, and an update instruction unit for transmitting the download data to the corresponding expander and instructing the corresponding expander to update the firmware at a timing for updating the firmware, which is determined by the terminal based on the initialization determining information transmitted from the transmission unit.

According to another aspect of the present invention, there is provided a method of instructing to update firmware using a plurality of expanders connected to a disk device in which data transmitted from a host device is stored and a controller unit for controlling the expander, the method including: a first step of determining whether or not, when download data is received from a predetermined terminal in order to update firmware of the expander, it is necessary to initialize a corresponding expander after downloading the download data by the expander; a second step of transmitting initialization determining information determined in the first step to the terminal; and a third step of transmitting the download data to the corresponding expander and instructing the corresponding expander to update the firmware at a timing for updating the firmware, which is determined by the terminal based on the initialization determining information transmitted in the second step.

Therefore, since the firmware can be updated at the timing specified by a manager, it can be previously and effectively prevented that the transmission/reception of data is not performed temporarily, and the degradation of transmission/reception performance of data can be reduced.

According to the present invention, it can implement a storage device and a method of instructing to update the firmware, which can increase the speed of transmission/reception of data and reliability thereof.

BRIEF DESCRIPTION OF THE DRAWINGS

The invention will be described with reference to the accompanying drawings, wherein identical numbers reference identical elements.

DESCRIPTION OF EXEMPLARY EMBODIMENTS

Hereinafter, an embodiment of the present invention will be described in detail with reference to the accompanying drawings. However, the present invention is not limited to this.

Figure 1:
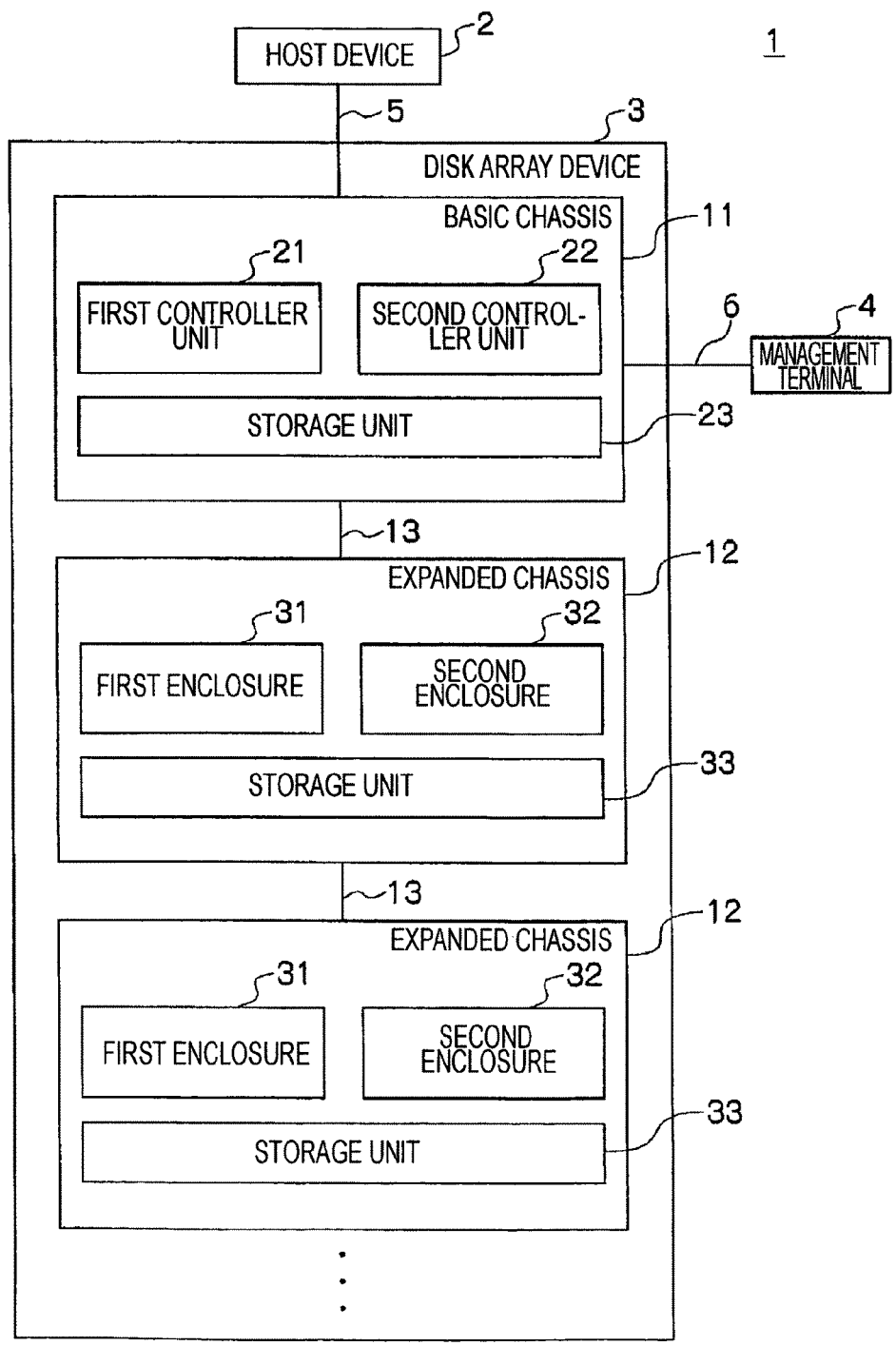
FIG. 1 is a block diagram illustrating a configuration of a storage system according to an embodiment.

FIG. 1 shows an example of a configuration of storage system 1 according to an embodiment. The storage system 1 includes a host device 2, a disk array device 3, and a management terminal 4. In the storage system 1, the host device 2 is connected to the disk array device 3 through a network 6 such as an SAN (storage area network). Further, in the storage system 1, the disk array device 3 is connected to the management terminal 4 through a network 7 such as a LAN (local area network).

The host device 2 is, for example, a computer which includes information processing resources, such as a CPU (central processing unit) or a memory. For example, the host device includes a personal computer, a workstation, and a mainframe or the like. Further, the host device 2 is provided with, for example, an information input device (not shown), such as a keyboard, a pointing device, and a microphone, or an information output device (not shown), such as a monitor display, a speaker or the like. Further, the host device 2 is provided with an application program which controls transmission/reception of data by using a memory region provided from the disk array device 3, an backup program which performs a backup of a volume 46 (to be described later) of the disk array device 3, and an adapter (not shown) for accessing to the disk array device 3 through the network 6.

The disk array device 3 is provided with a basic chassis 11 and an expanded chassis 12. In the disk array device 3, the basic chassis 11 and the expanded chassis 12, or the expanded chassis are connected with each other through a network 13, such as an SAS (serial attached SCSI) or the SAN, and a WAN (world area network).

The basic chassis 11 is provided with a first controller unit 21, a second controller unit 22, and a storage unit 23. The basic chassis 11 is necessary to be provided with at least one of controller units. In the embodiment, for increase in reliability, two controller units of the first controller unit 21 and the second controller unit 22 are provided at the same disk device 45 (to be described later) in order to have redundancy. The first controller unit 21 and the second controller unit 22 transmit/receive data between the host 2 and the storage unit 23 or the expanded chassis 12 by controlling the entire disk array device 3. The storage unit 23 is provided with the disk device 45 (to be described later) in which data transmitted from the first controller unit 21 and the second controller unit 22 is stored.

The expanded chassis 12 is provided with a first enclosure (ENC) 31, a second enclosure 32, and a storage unit 33. The expanded chassis 12 is necessary to be provided with at least one enclosure. In the embodiment, for increase in reliability, two enclosures of the first enclosure 31 and the second enclosure 32 are provided at the same disk device 45 (to be described later) in order to have redundancy. The first enclosure 31 and the second enclosure 32 transmit/receive data between the first controller unit 11, the second controller unit 12, and the storage unit 33 of the expanded chassis 12 of its own or another expanded chassis 12 by controlling the entire expanded chassis 12. The storage unit 33 is provided with the disk device 45 (to be described later) in which data transmitted from the first enclosure 31 and the second enclosure 32 is stored.

The management terminal 4 is provided with, for example, a notebook personal computer. Further, the detailed configuration of the management terminal 4 will be described later. The management terminal 4 manages the disk array device 3, for example, by transmitting download data to the basic chassis 11 in order to update firmware 99 (to be described later) of the basic chassis 11 and the expanded chassis 12, and by determining a timing for updating the corresponding firmware 99 (to be described later).

Figure 2:
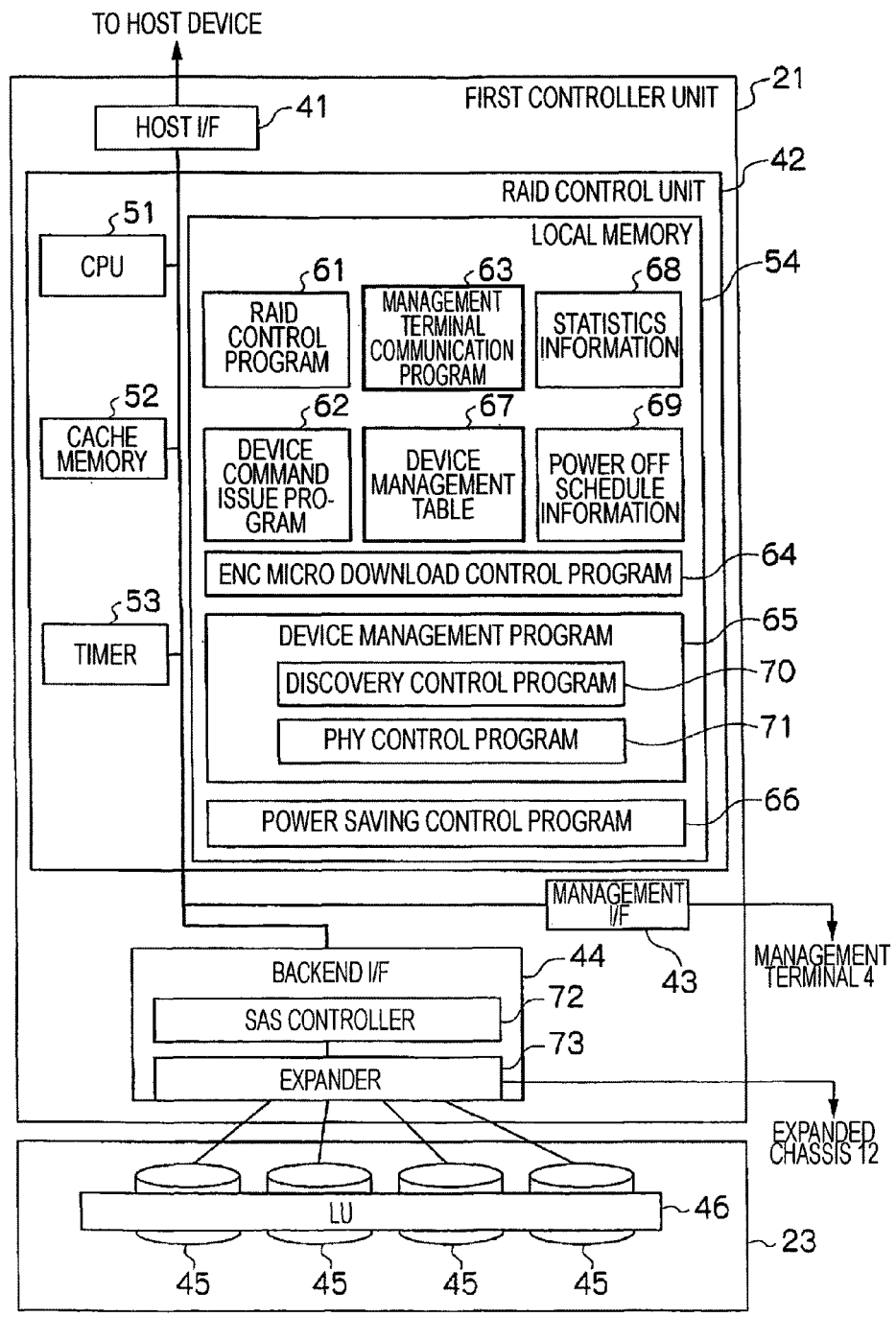
FIG. 2 is a block diagram illustrating a basic chassis.

FIG. 2 shows an example of a configuration of the basic chassis 11. Further, since the second controller unit 22 has the same configuration as the first controller unit 21, it is not illustrated in FIG. 2. The first controller unit 21 is provided with a host I/F 41, an RAID (redundant arrays of independent disks) control unit 42, a management I/F 43, and a backend I/F 44. Further, the storage unit 23 is provided with the disk device 45, such as a fibre channel, the SAS, and an SATA (serial ATA).

The host I/F 41 connects the host device 2 through a network 5 and controls transmission/reception of various commands or data transmitted from the host device 2. The host I/F 41 can use various interfaces according to the type of network 5.

The RAID control unit 42 is provided with a CPU 51, a cache memory 52, a timer 53, and a local memory 54.

The CPU 51 is provided at every controller by one. The CPU 51 controls the entire first controller unit 21 by performing various programs. For example, the CPU 51 analyzes commands transmitted from the host I/F 41 and transmits instructions to each component. Further, the CPU 51 performs an RAID control with respect to the disk device 45, thereby can increase reliability, usability, and performance of the disk array device 3.

In this case, the CPU 51 operates the disk device 45 in accordance with an RAID method. The CPU 51 sets one or more logical volumes 46 (hereinafter, referred to as a volume (LU: logical unit)) on physical memory regions (RAID group) provided from one or more disk devices 45. Then, data is stored in the volume in unit a block (hereinafter, referred to as a logical block) with a predetermined size.

The volumes 46 are assigned with unique identifiers (hereinafter, referred to as an LUN (logical unit number)), respectively. In the embodiment, data is input or output to an address which is made by combining the LUN with a unique number (LBA: logical block address) assigned to each logical block.

In the cache memory 52, the data received from the host device 2 is temporarily stored or various pieces of table used in the disk array device 3 are stored. In this case, a part of cache memory 52 is used as a memory shared with the second controller unit 22. When one of controllers is closed (troubled), the information is taken over another normal controller.

The timer 53 manages clocks in the first controller unit 21. In the local memory 54, various programs or various pieces of table used in the first controller unit 21 are stored.

In the local memory 54, an RAID control program 61, a device command issue program 62, a management terminal communication program 63, an ENC micro download control program 64, a device management program 65, a power saving control program 66, a device management table 67, power off schedule information 68, and statistics information 69 are stored.

The RAID control program 61 performs the RAID control with respect to the disk device 45 as described above. The device command issue program 62 issues a command to the backend I/F 44 or the expanded chassis 12. The management terminal communication program 63 communicates with the management terminal 4. The ENC micro download control program 64 controls an update of the firmware 99 (to be described later) in the expander 73 (to be described later). The device management program 65 is provided with a discovery control program 70 and a PHY control program 71. The discovery control program 70 performs a control with respect to a discovery command. The PHY control program 71 controls a PHY 100 (to be described later) in the expander 73. The device management table 67 is used for managing the expander 73 or the disk device 45, and the volume 46. The power off schedule information 68 schedules the disk device 45 which switches to a power saving mode to power off the disk device 45 for power saving. The statistics information 69 compiles statistics of the transmission/reception (input/output) of data in a predetermined period of time. Further, in the local memory 54, various information statistics programs which compile statistics of I/O of expanders 73 in every predetermined period of time are stored.

The management I/F 43 is connected to the management terminal 4 through the network 6 and controls a transmission/reception of various commands or data transmitted from the management terminal 4. The management I/F 43 can use various interfaces according to the types of network 6.

The backend I/F 44 is provided with an SAS controller 72 and the expander 73. The backend I/F 44 is connected to the disk device 45 of the storage unit 23 or the expanded chassis 12 and controls the transmission/reception of data transmitted from the host device 2. The backend I/F 44, in addition to the SAS, can use various interfaces according to the types of the fibre channel, the SATA (serial ATA) or the like. The SAS controller 72 controls the entire backend I/F 44, and controls writing data to the disk device 45 or reading data from the disk device 45.

Figure 3:
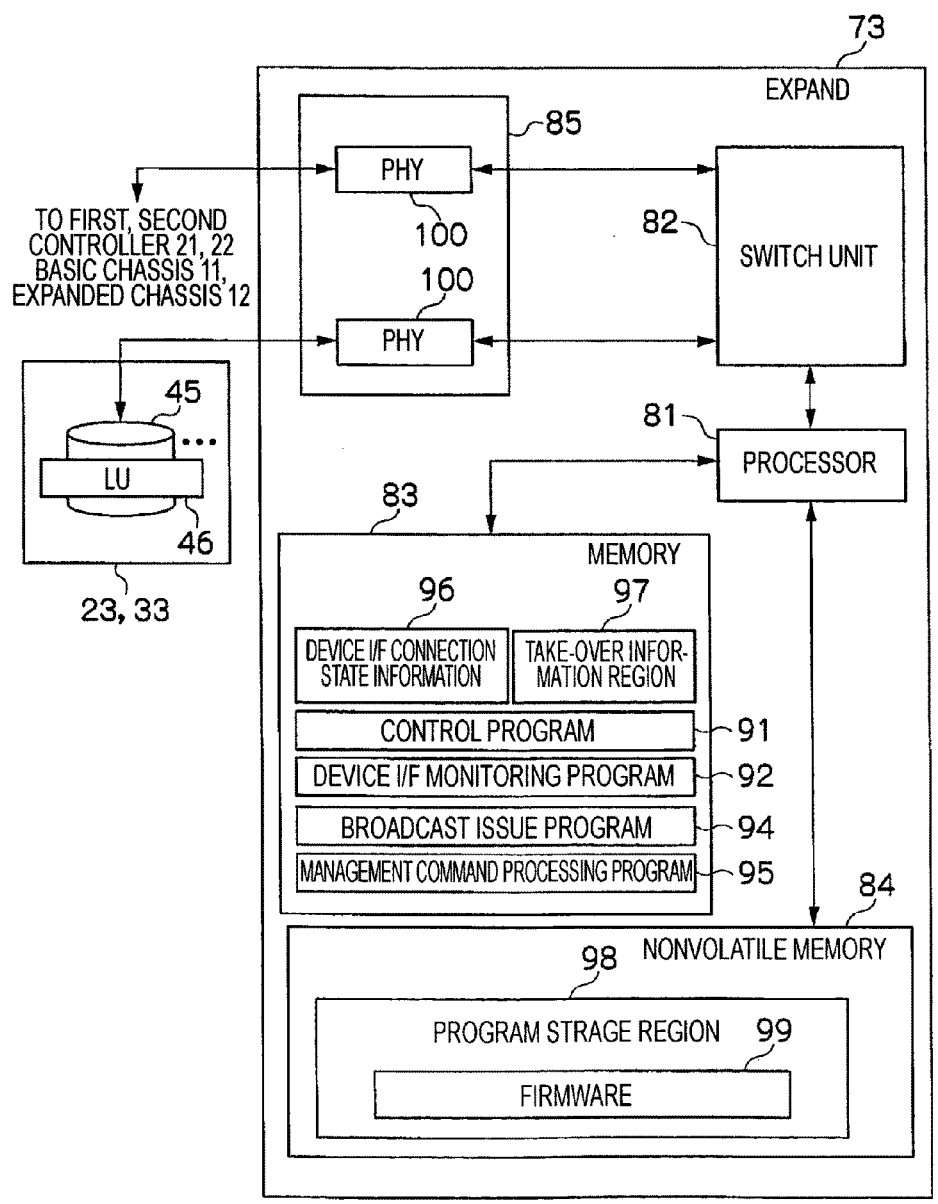
FIG. 3 is block diagram illustrating a configuration of an expander.

FIG. 3 shows an example of a configuration of the expander 73. The expander 73 is provided with a processor 81, a switch unit 82, a memory 83, a nonvolatile memory 84, and a device I/F 85.

The processor 81 is provided at every the expander 73 by one. The processor 81 controls the entire expander 73 by performing various programs. For example, the processor 81 analyzes, commands transmitted from the first controller unit 21 and the second controller unit 22 so as to transmit instructions to each component. The switch unit 82 controls switching of the PHY 100 (to be described later) of the device I/F 85 under control of the process 81.

In the memory 83, a control program 91, a device I/F monitoring program 92, a broadcast issue program 94, a management command processing program 95, and device I/F connection state information 96 are stored. Further, the memory 83 is provided with a take-over information region 97.

The control program 91 controls the entire expander 73. The device I/F monitoring program 92 monitors I/O of the PHY 100 of the device I/F 85. The broadcast issue program 94 issues a broadcast command. The management command processing program 95 processes a management command transmitted from the first controller unit 21 and the second controller unit 22. The device I/F connection state information 96 is an information on a connection state among the PHY 100 of the device I/F 85, a PHY 100 (to be described later) of the first controller unit 21, the second controller unit 22 or the expanded chassis 12, and the disk device 45 of the storage unit 23. In the take-over information region 97, various pieces of take-over information when the expander 73 is initialized are stored.

The nonvolatile memory 84 is provided with a program storage region 98. In the program storage region 98, the firmware 99 of the expander 73 is stored. The firmware 99 is updated by downloading download data 109 (to be described later).

The device I/F 85 is provided with a plurality of PHYs 100. The PHY 100 is connected to the PHY 100 (to be described later) of the first controller unit 21, the second controller unit 22 or the expanded chassis 12, and the disk device 45 the storage unit 23 so as to transmit/receive data.

Further, the first enclosure 31 and the second enclosure 32 of the expanded chassis 12 are provided with the same expander 73 as shown in FIG. 3. In this case, the PHY 100 of the expanded chassis 12 is connected to the PHY 100 of the basic chassis 11 or the PHY 100 of the expanded chassis 12, and the disk device 45 of the storage unit 33 so as to transmit/receive data.

Figure 4:
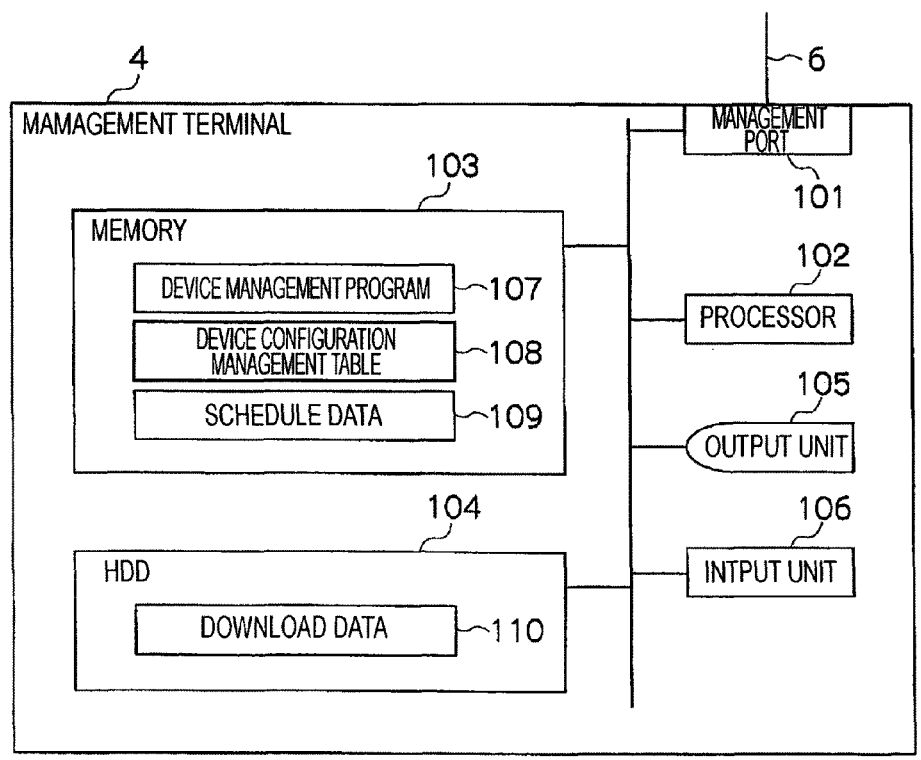
FIG. 4 is a block diagram illustrating a management terminal.

FIG. 4 shows an example of a configuration of the management terminal 4. The management terminal 4 includes a management port 101 for connecting to the disk array device 3 through the network 6, a processor 102, a memory 103, a disk device (HDD: hard disk drive) 104, an output unit 105 such as a display device for displaying a screen where a timing for updating firmware 99 is determined, and an input unit 106 such as a keyboard for inputting an instruction from the manager, which are interconnected via a circuit such as an internal bus.

In the memory 103, a device management program 107 managing the disk array device 3, a device configuration management table 108 managing a configuration of the disk array device 3, and a schedule data 109 assigned a timing for updating the firmware 99 by the manager are stored. The management program 107 obtains, for example, configuration information from the disk array device 3 according to a request of the manager and displays the information to a user through the output unit 105. Further, the device management program 107 stores the obtained configuration information to the device configuration management table 108.

In the disk device 104, download data 110 for updating the firmware 99 of the expander 73 is stored. Further, the download data 110 is stored in a predetermined recordable medium or the like. When transmitting to the disk array device 3, the download data may be read through the management terminal 4.

Figure 5:
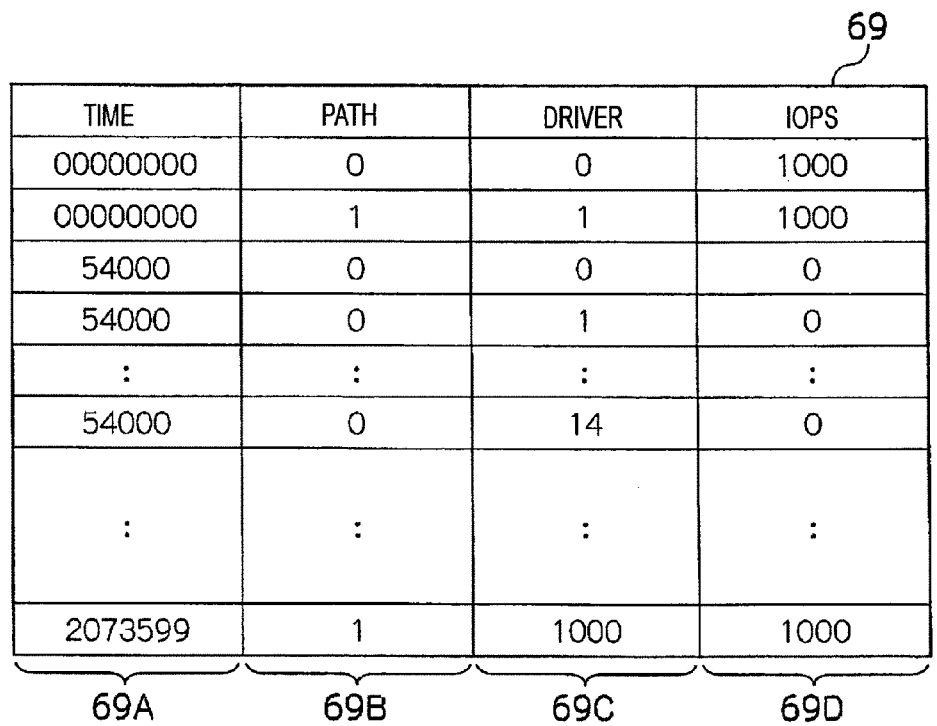
FIG. 5 is a conceptual diagram illustrating a configuration of statistics information.

FIG. 5 shows an example of a configuration of the statistics information 69. The statistics information 69 is referred by the manager of the management terminal 4 in order to determine timing for updating the firmware 99. The statistics information 69 includes a time entry 69A, a path entry 69B, a driver entry 69C, and an IOPS (input/output per second) (frequency of transmission/reception of data per 1 second) entry 69D. The time entry 69A manages time when data is stored in the disk device 45. The path entry 69B manages a path (a bundle of a plurality of the PHYs 100) on which data is passed during being stored in the disk device 45. The driver entry 69C manages a driver (disk device 45) where data is stored. The IOPS entry 69D manages an IOPS of the disk device 45 stored in the driver entry 69C.

Figure 6:
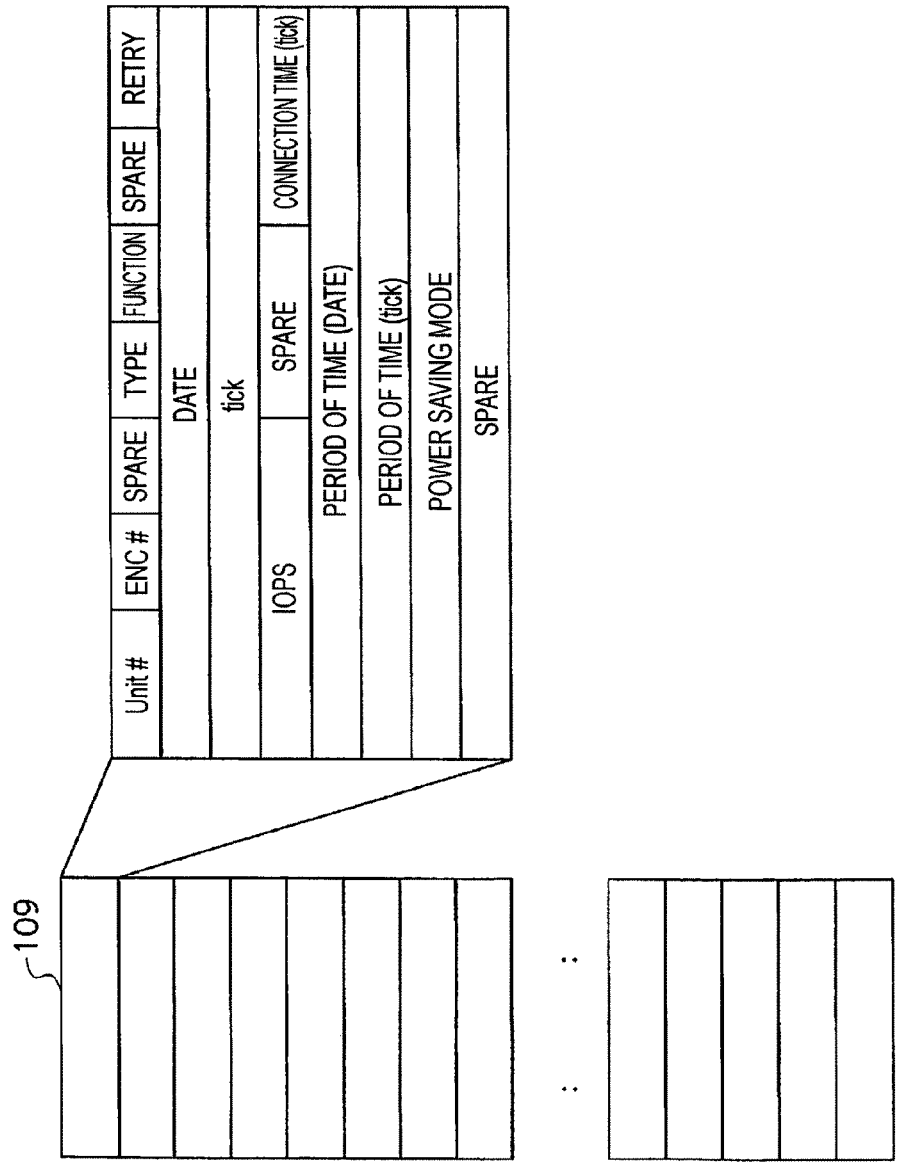
FIG. 6 is a conceptual diagram illustrating a configuration of a schedule data.

FIG. 6 shows an example of a configuration of the schedule data 109. The schedule data 109 is configured with a unit number entry of the expander 73, an enclosure number entry, a type entry, a function entry, a date entry, an IOPS entry, a duration time entry, a period of time (date) entry, a period of time (tick) entry, a power saving mode entry or the like in every expander 73 which updates the firmware 99. For example, when the data "2008/07/22 05:00" is stored in a predetermined date entry, the expander 73 in response to the corresponding date entry updates the firmware 99 at 5:00 in Jul. 22, 2008. Further, when the data "no more than 100" is stored in a predetermined IOPS entry, the expander 73 in response to the corresponding date entry updates the firmware 99 when the IOPS of the corresponding expander 73 is no more than 100. Further, when the data "ON" is stored in a predetermined power saving mode entry, the expander 73 in response to the corresponding power saving mode entry updates the firmware 99 when the disk device 45 of the corresponding expander 73 proceeds to the power saving mode.

Figure 7:
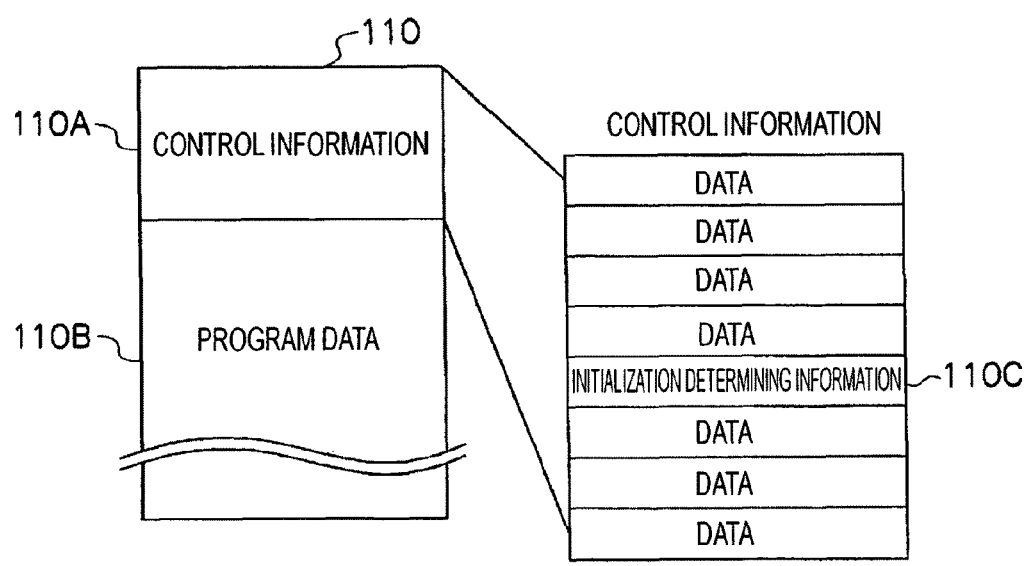
FIG. 7 is a conceptual diagram illustrating a configuration of download data.

FIG. 7 shows an example of a configuration of the download data 110. The download data 110 is provided with control information 110A which controls the corresponding download data 110 and program data 110B which is substantial data to update the firmware 99. The control information 110A is provided with initialization determining information 110C which determines whether or not the expander 73 is initialized when the firmware 99 is updated, in addition to control data.

Figure 8:
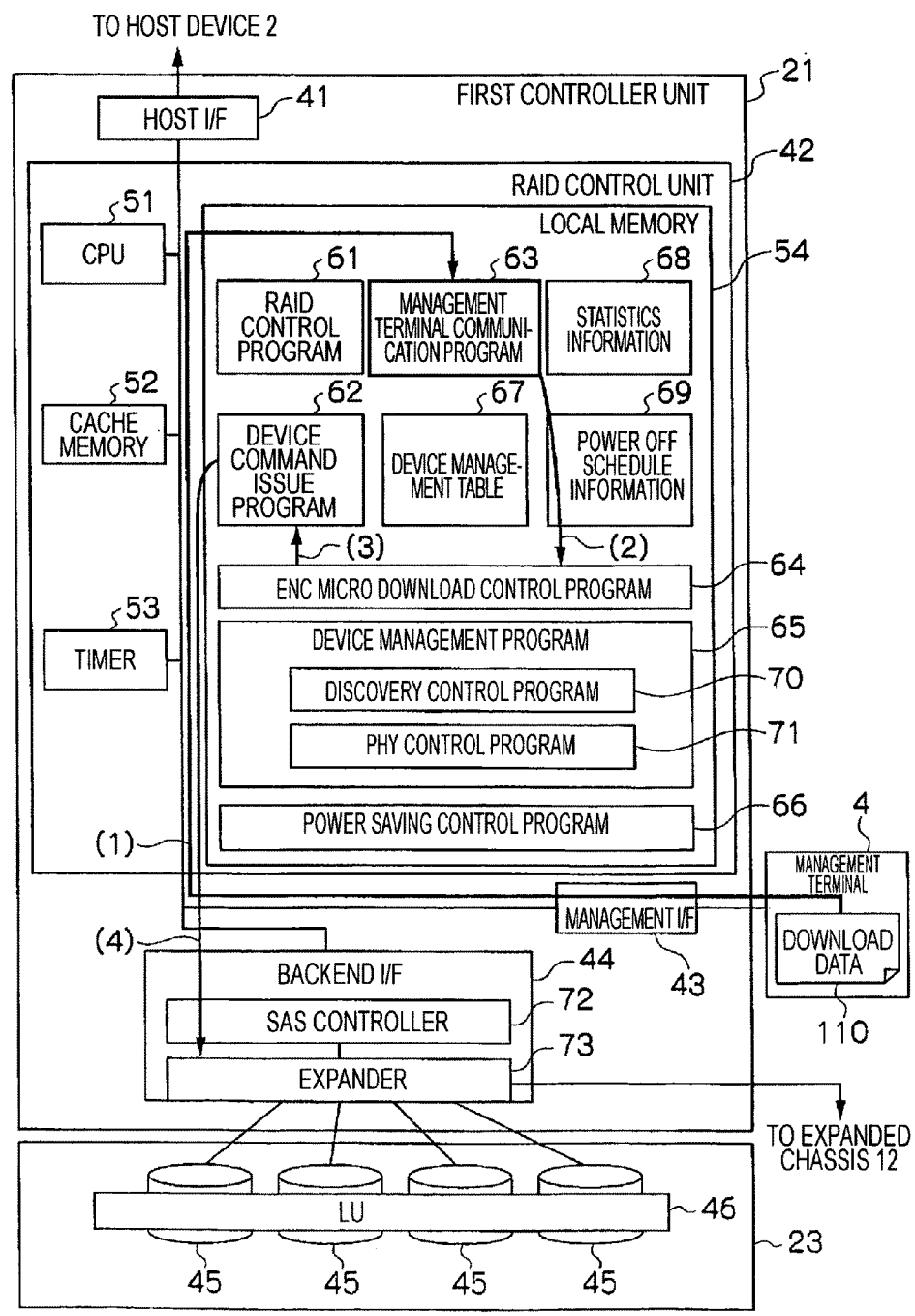
FIG. 8 is a conceptual diagram illustrating a flow of updating firmware.

FIG. 8 shows an example of a flow in the disk array device 3 when receives the download data 110 and updates the firmware 99 of the expander 73. In the following descriptions, a process is expressed to be executed by a program as a subject of the sentence, but in actuality, the CPU 51 performing the program carries out the process.

First, the management terminal communication program 63 receives the download data 110 from the management terminal 4 at a predetermined timing (refer to (1) in FIG. 8) and starts the ENC micro download control program 64 (refer to (2) in FIG. 8). Subsequently, when receiving the download data 110 from the management terminal communication program 63 (refer to (2) in FIG. 8), the ENC micro download control program 64 starts the device command issue program 62 at a timing for updating the firmware 99 (refer to (3) in FIG. 8). Then, the device command issue program 62 transmits the download data 110 to the corresponding expander 73 (refer to (4) in FIG. 8). The expander 73 received the download data 110 updates the firmware 99 by downloading the download data 110.

Figure 9:
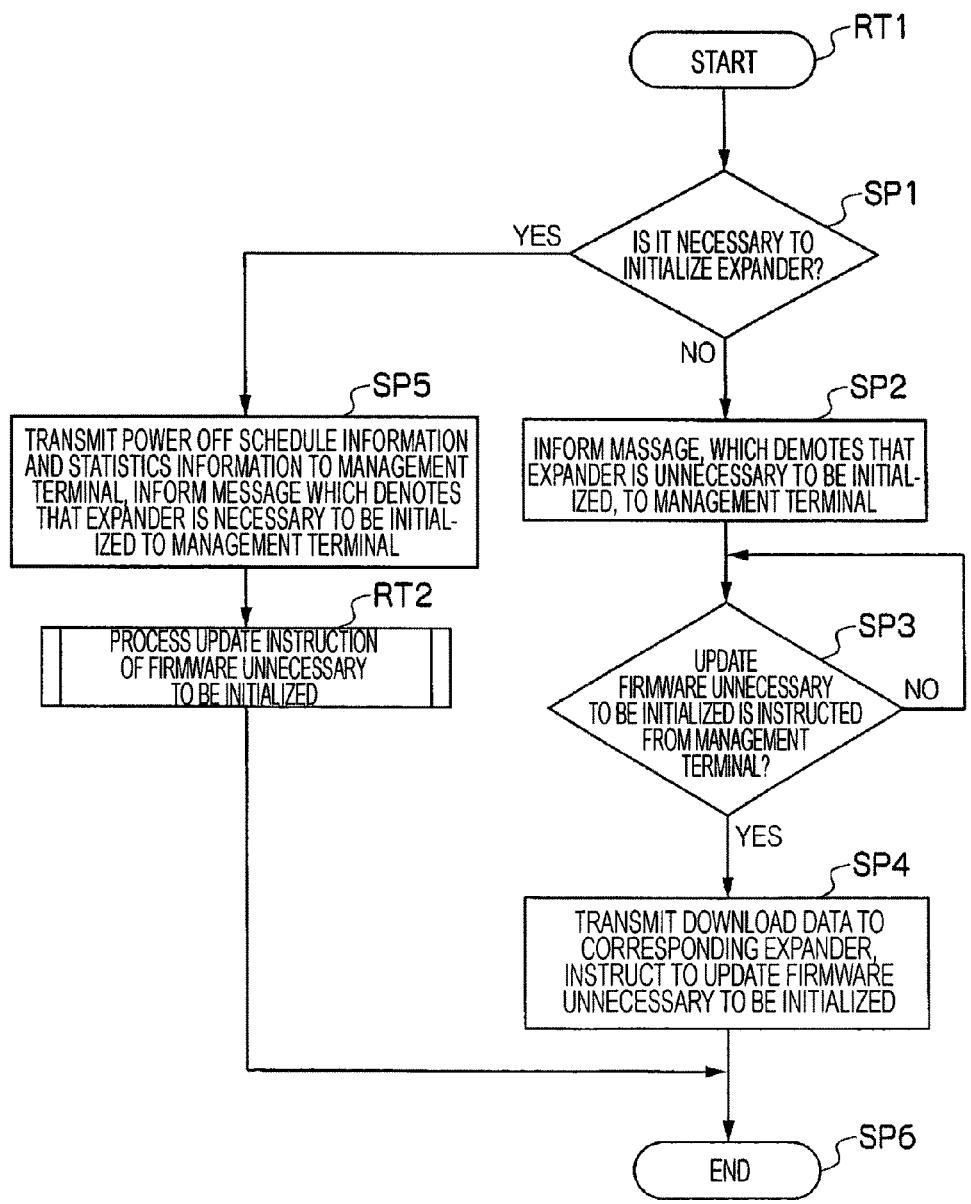
FIG. 9 is a flowchart illustrating a processing sequence of a firmware update instruction.

FIG. 9 shows an example of a flowchart illustrating a particular processing sequence of the CPU 51 in the disk array device 3 with respect to a process of a firmware update instruction of the disk array device 3 in the storage system 1.

When receiving the download data 110 from the management terminal 4 via the management terminal communication program 63, the ENC micro download control program 64 determines whether or not the expander 73 is necessary to be initialized (SP1) with reference to the initialization determining information 110C of the download data 110 after the expander 73 updates the firmware 99 by downloading the download data 110 according to the processing sequence RT1 of the firmware update instruction shown in FIG. 9. Further, the determination whether or not the expander 73 is necessary to be initialized may be carried out by the management terminal 4.

Further, when the download data 110 is unnecessary to be initialized and the expander 73 is unnecessary to be initialized after updating the firmware 99 (NO in SP1), the ENC micro download control program 64 informs a message, which denotes that the expander 73 is unnecessary to be initialized, to the management terminal 4 via the management terminal communication program 63 (SP2).

Subsequently, the ENC micro download control program 64 waits in a standby mode until the update of firmware 99 unnecessary to be initialized is instructed from the management terminal 4 (SP3). When the update of firmware 99 unnecessary to be initialized is instructed from the management terminal 4 (YES in SP3), the ENC micro download control program 64 transmits the download data 110 to the corresponding expander 3 and the update of firmware 99 unnecessary to be initialized is instructed (SP4). Then, the processing sequence RT1 of the firmware update instruction shown in FIG. 9 is completed (SP6).

In this regard, when the download data 110 is necessary to be initialized and the expander 73 is necessary to be initialized after updating the firmware 99 (YES in SP1), the ENC micro download control program 64 transmits the power off schedule information 68 and the statistics information 69 to the management terminal 4 and informs a message, which denotes that the expander 73 is necessary to be initialized, to the management terminal 4 (SP5).

Subsequently, the ENC micro download control program 64 performs a processing sequence (RT2) of the firmware update instruction when the initialization is necessary. After that, the ENC micro download control program 64 completes the processing sequence RT1 of the firmware update instruction shown in FIG. 9 (SP6). Further, a process of the firmware update instruction when the initialization is necessary will be described later in detail.

Figure 10:
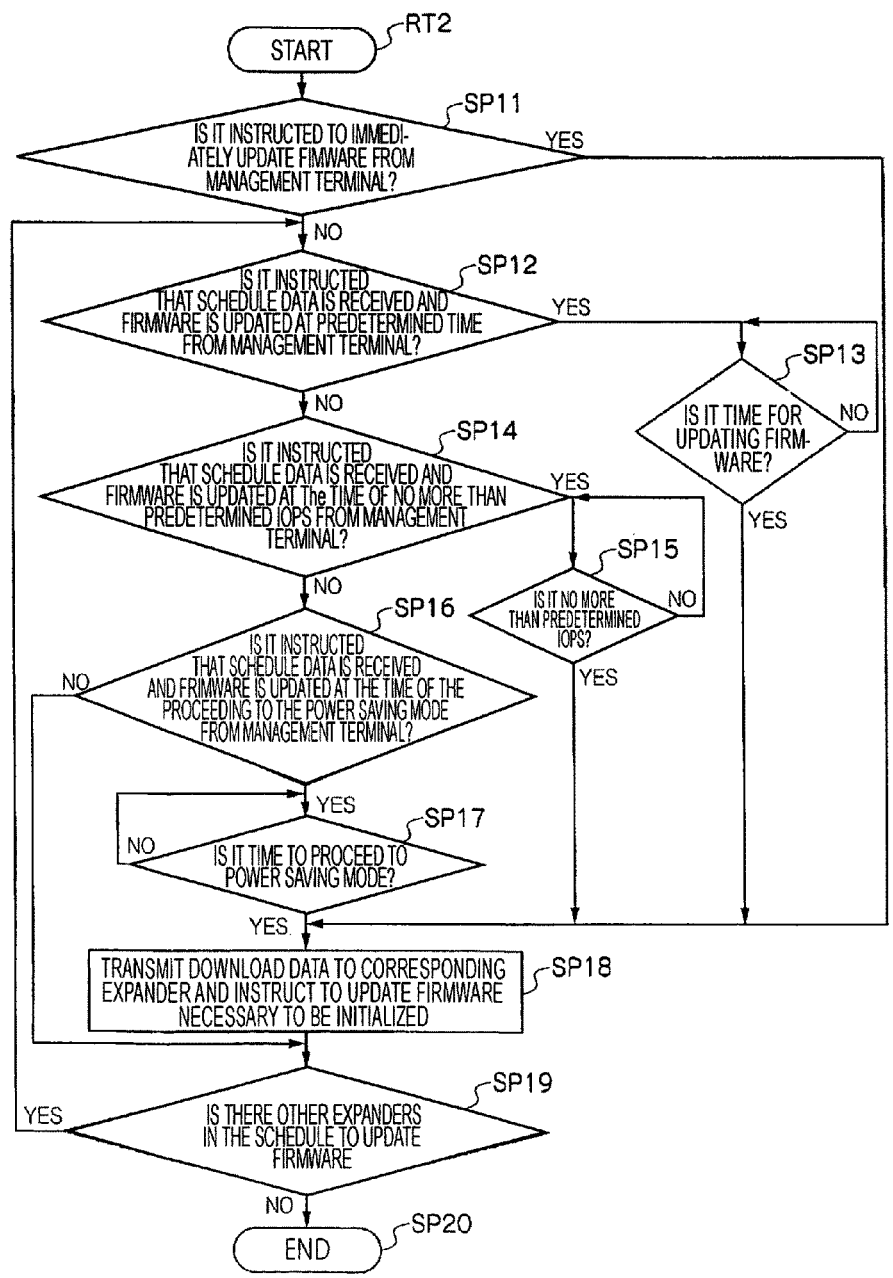
FIG. 10 is a flowchart illustrating a processing sequence of a firmware update instruction when initialization is necessary.

FIG. 10 shows an example of a flowchart illustrating a particular processing sequence of the CPU 51 of the disk array device 3 with respect to a process of the firmware update instruction when the initialization of the disk device 3 in the storage system 1 is necessary.

When informing a message, which denotes that the initialization of expander 73 is necessary, to the management terminal 4 through the management terminal communication program 63 (SP5), the ENC micro download control program 64 determines whether or not the immediate update of the firmware 99 is instructed from the management terminal 4 according to the processing sequence RT2 of the firmware update instruction when the initialization is necessary shown in FIG. 10 (SP11).

Figure 11:
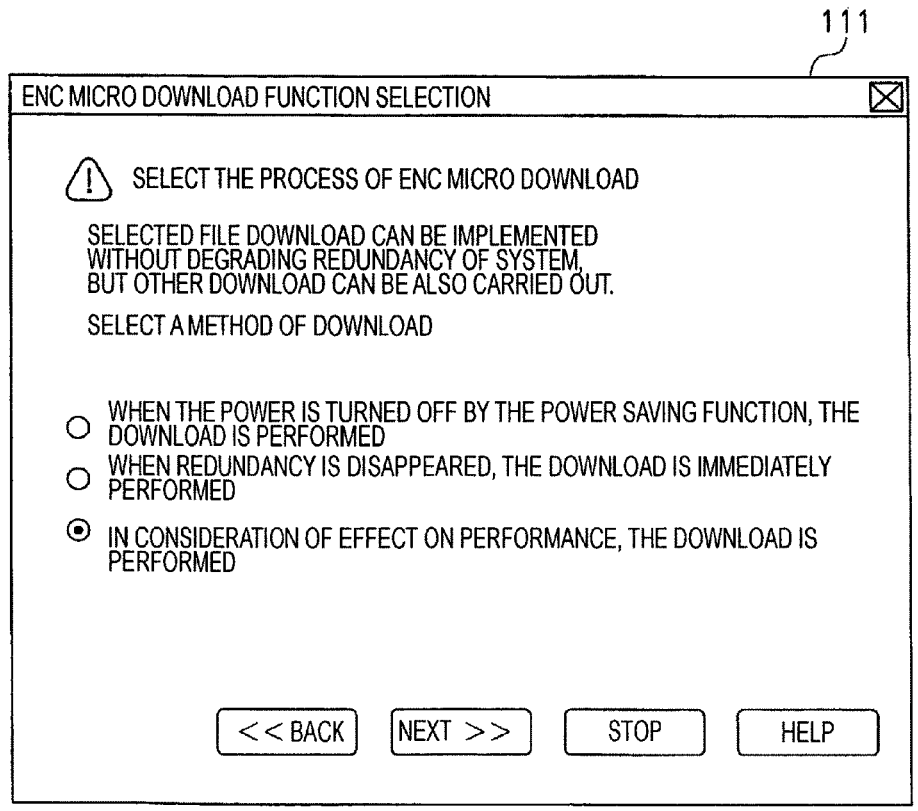
FIG. 11 is a conceptual diagram illustrating a configuration of a selection screen.

In this case, when being informed a message, which denotes that the initialization of expander 73 is necessary, from the disk array device 3, the management terminal 4 displays a selection screen 111 shown in FIG. 11 to a display screen of the output unit 105.

FIG. 11 shows an example of a configuration of the selection screen 111 where a method of downloading the download data 110 is selected, which is displayed on the display screen of the output unit 105 of the management terminal 4. The selection screen 111 displays three options, for example, "when the power is turned off by the power saving function, the download is performed," "when redundancy is disappeared, the download is immediately performed," and "In consideration of effect on performance, the download is performed" such that the manager can select any of them.

When a check button of "when redundancy is disappeared, the download is immediately performed" is checked and a confirmation button (not shown) is pressed by the operation of the manager, the management terminal 4 instructs the disk array device 3 to immediately update the firmware 99.

When it is instructed to immediately update the firmware 99 from the management terminal 4 (YES in SP11), the ENC micro download control program 64 proceeds to step SP18. In this regard, when it is not instructed to immediately update the firmware 99 from the management terminal 4 (NO in SP11), the ENC micro download control program 64 receives the schedule data 109 and determines whether or not it is instructed to update the firmware 99 at a predetermined time from the management terminal 4 (SP12).

In this case, when a message, which denotes that the expander 73 is necessary to be initialized, is informed from the disk array device 3, the management terminal 4 displays the selection screen 111 to the display screen of the output unit 105. Subsequently, when a check button of "In consideration of effect on performance, the download is performed" is checked and a button "next" is pressed by the operation of the manager, the management terminal 4 displays the selection screen 112 shown in FIG. 12 to the display screen of the output unit 105.

Figure 12:
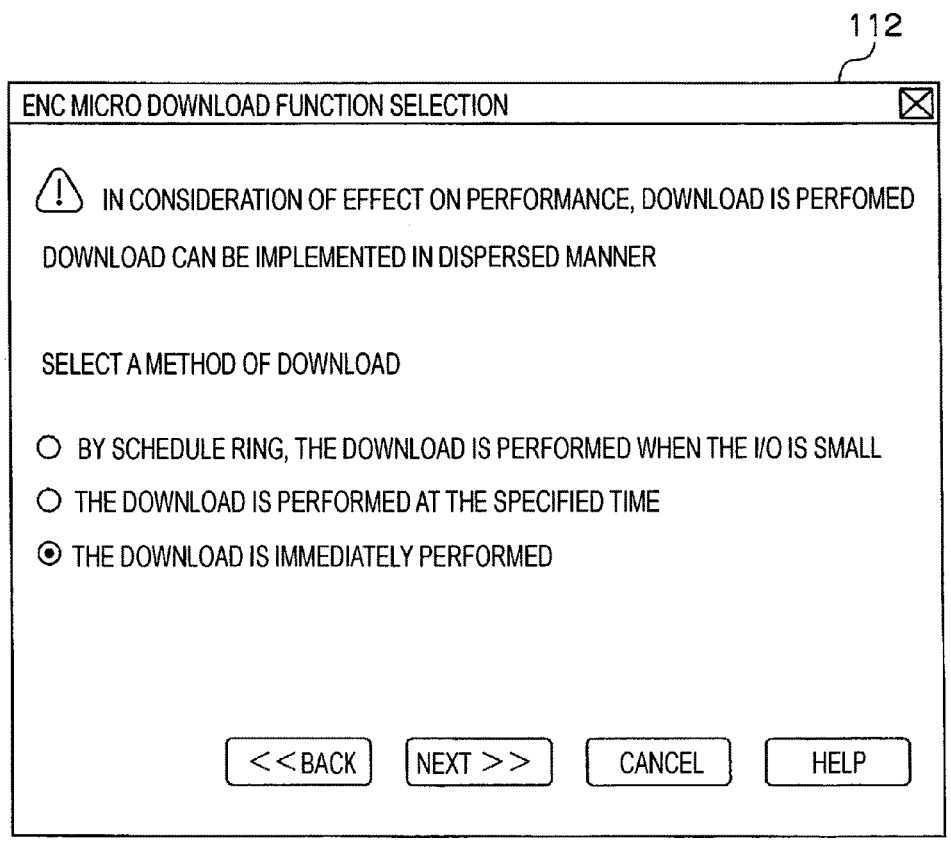
FIG. 12 is a conceptual diagram illustrating a configuration of a selection screen.

FIG. 12 shows an example of a configuration of the selection screen 112 in which a download method in consideration of effect on performance of the download data 110 is selected, which is displayed on the display screen of the output unit 105 of the management terminal 4. The selection screen 112 displays three options, for example, "By schedule, the download is performed when the I/O is small," "the download is performed at the specified time," and "the download is immediately performed" such that the manager can select any of them.

Subsequently, for example, when a check button of "the download is performed at the specified time" is checked and the button "next" is pressed by the operation of the manager, the management terminal 4 displays a creation screen 113 of the schedule data 109 shown in FIG. 13 to the display screen of the output unit 105.

Figure 13:
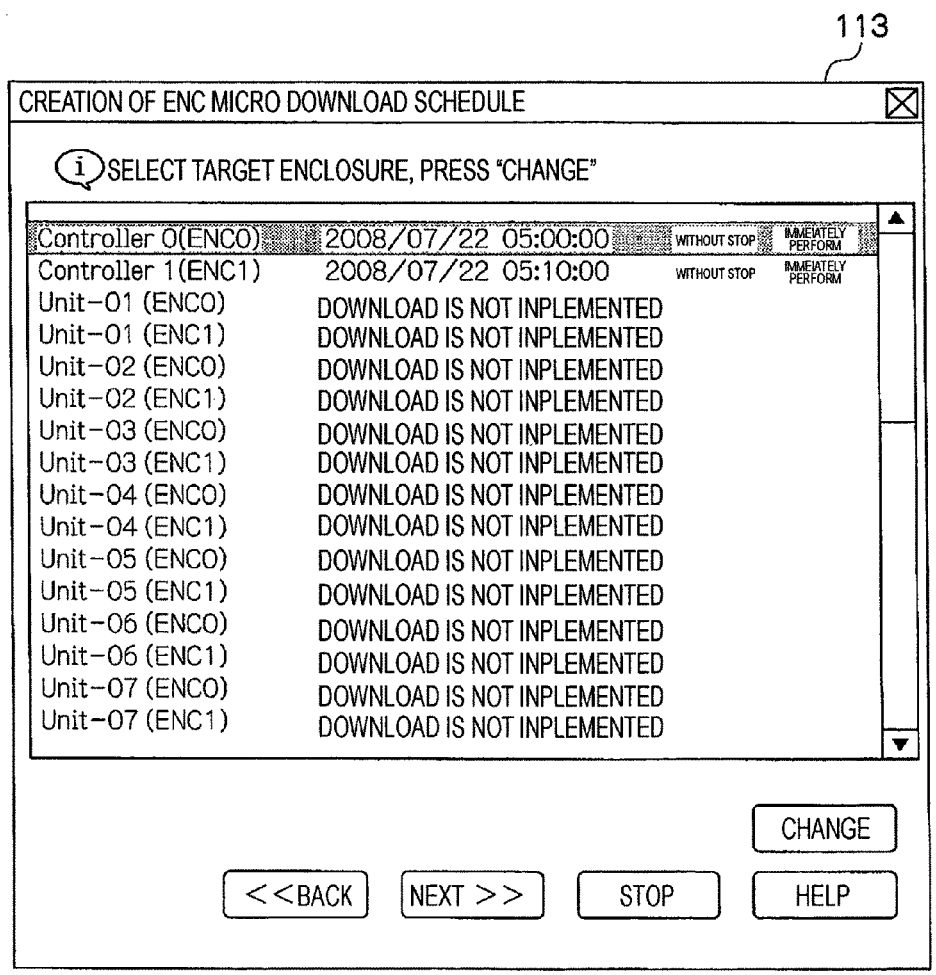
FIG. 13 is a conceptual diagram illustrating a configuration of a creation screen.

FIG. 13 shows an example of a configuration of the creation screen 113 for creating the schedule data 109, which is displayed on the display screen of the output unit 105 of the management terminal 4. In the creation screen 113, the first controller unit 21, the second controller unit 22, the first enclosure 31, and the second enclosure 32 are displayed so as to be selectable. Further, the creation screen 113 displays a schedule or the like on the first controller unit 21, the second controller unit 22, the first enclosure 31, and the second enclosure 32.

Subsequently, for example, when the first controller unit 21 (Controller 0 (ENC0)) is selected and a button "change" is pressed by the operation of the manager, the management terminal 4 displays the creation screen 114 of the schedule data 109 shown in FIG. 14 to the display screen of the output unit 105.

Figure 14:
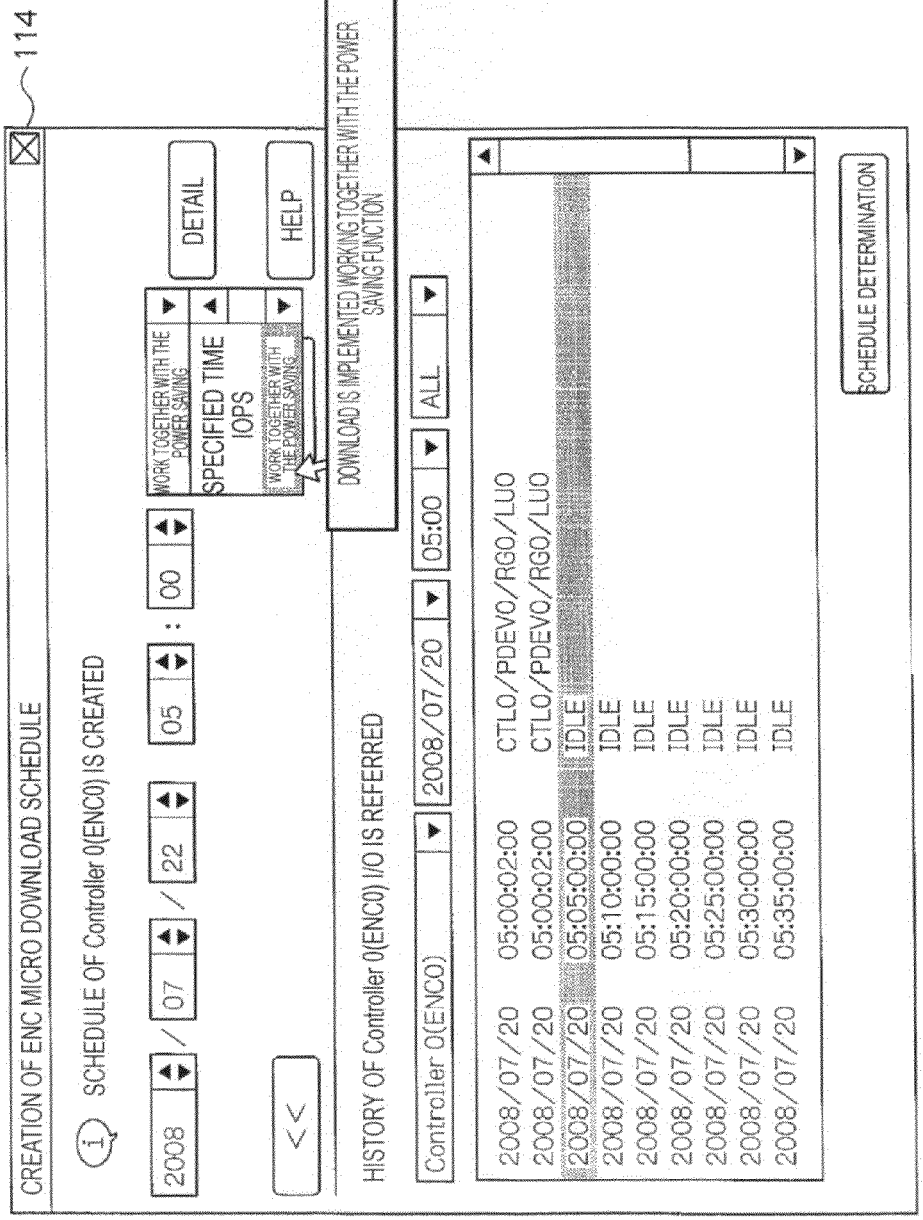
FIG. 14 is a conceptual diagram illustrating a configuration of a creation screen.

FIG. 14 shows an example of a configuration of the creation screen 114 for creating the schedule data 109, which is displayed on the display screen of the output 105 of the management terminal 4. In the creation screen 114, for example, "Time for updating the firmware 99", "IOPS for updating the firmware 99", or "Update the firmware 99 by working together with the proceeding to the power saving mode" are displayed as "a download method in consideration of effect on performance", which can be selected by the manager. Further, in the creation screen 114, power off schedule information, or history information of I/O or the like of the target controller unit or the enclosure is displayed on the basis of the power off schedule information 68 and the statistics information 69.

Subsequently, for example, when "the specified time" is selected for "a download method in consideration of effect on performance", "2008/07/22 05:00" is selected for "Time for updating the firmware 99", and a button "Schedule determination" is pressed by the operation of the manager, the management terminal 4 determines a schedule of the first controller unit 21 (Controller 0 (ENC0)) and returns to the creation screen 113 shown in FIG. 13, and then the determined schedule of the first controller unit 21 (Controller 0 (ENC0)) is reflected on the creation screen 113 shown in FIG. 13.

Figure 15:
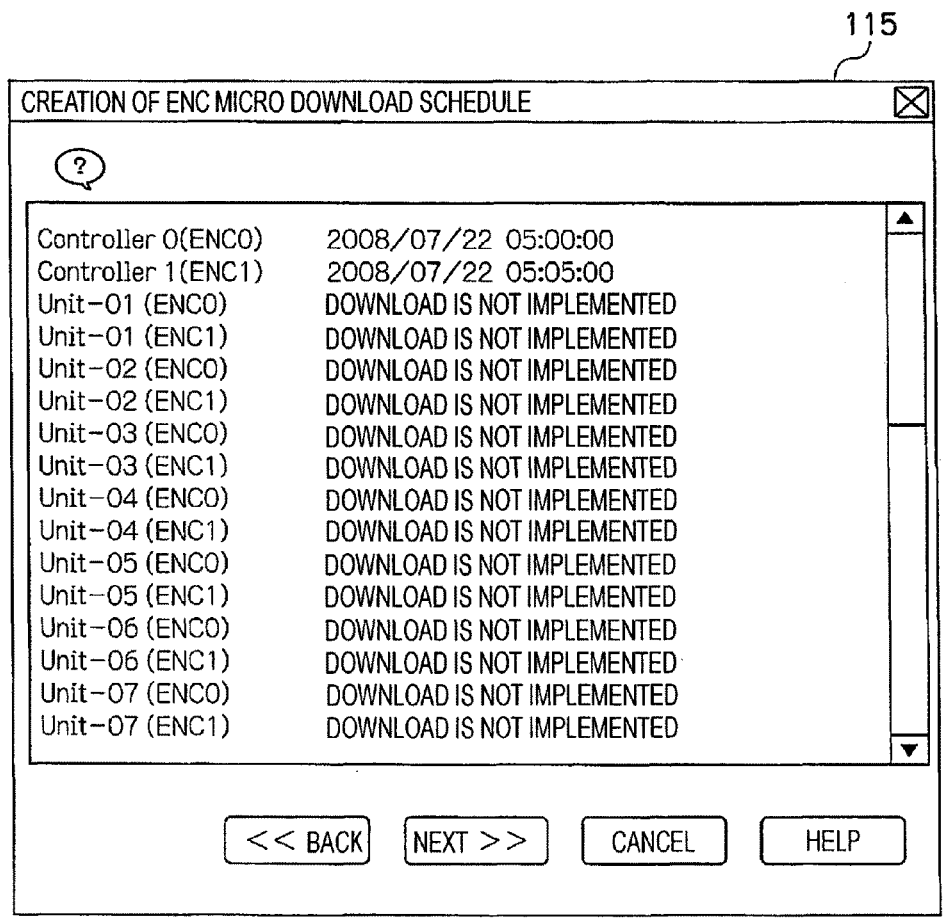
FIG. 15 is a conceptual diagram illustrating a configuration of a confirmation screen.

On the other hand, for example, when neither controller unit nor enclosure is selected by the operation of the manager in FIG. 13 and the button "Next" is pressed, a confirmation screen 115 of the creation for the schedule data 109 shown in FIG. 15 is displayed on the display screen of the output unit 105.

FIG. 15 shows an example of a configuration of the confirmation screen 115 of the creation for the schedule data 109, which is displayed on the display screen of the output unit 105 of the management terminal 4. In the confirmation screen 115, schedules of the first controller unit 21, the second controller unit 22, the first enclosure 31, and the second enclosure 32 and the like are displayed.

For example, when the button "Next" is pressed and the confirmation button (not shown) is pressed by the operation of the manager, the management terminal 4 creates the schedule data 109, such as the firmware 99 of the first controller unit 21 (Controller 0 (ENC0)) is updated at 5:00 in Jul. 22, 2008, on the confirmation screen 115 shown in FIG. 15, and the corresponding schedule data 109 is transmitted to the management terminal 4.

Returning to FIG. 10, when it is instructed to update the firmware 99 at the predetermined time from the management terminal 4 (YES in SP12), the ENC micro download control program 64 waits in the standby mode until it is time for the corresponding expander 73 to update the firmware 99 (SP13). When it is time for the corresponding expander 73 to update the firmware 99 (YES in SP13), the ENC micro download control program 64 proceeds to step SP18.

In this regard, when it is not instructed to update the firmware 99 at the predetermined time from the management terminal 4 (NO in SP12), the ENC micro download control program 64 receives the schedule data 109, and determines whether or not it is instructed to update the firmware 99 from the management terminal 4 when the IOPS is no more than a specified IOPS (SP14).

In this case, in FIG. 12, when the check button "By schedule, the download is performed when I/O is small" is checked and the button "Next" is pressed by the operation of the manager, the management terminal 4 displays the creation screen 113 of the schedule data 109 shown in FIG. 13 on the display screen of the output unit 105.

Subsequently, when the first controller unit 21 (Controller 0 (ENC0)) is selected and the button "Change" is pressed by the operation of the manager, the management terminal 4 displays the creation screen 114 of the schedule data 109 shown in FIG. 14 on the display screen of the output unit 105.

Subsequently, for example, when the "IOPS" is selected for "a download method in consideration of effect on performance", "no more than 100" is selected for "IOPS for updating the firmware 99", and the button "Schedule determination" is pressed by the operation of the manager, the management terminal 4 determines the schedule of the first controller unit 21 (Controller 0 (ENC0)), and returning to the creation screen 113 shown in FIG. 13, so that the determined schedule of the first controller unit 21 (Controller 0 (ENC0)) is reflected on the creation screen 113 shown in FIG. 13.

On the other hand, in FIG. 13, for example, when neither controller unit nor enclosure is selected and the button "Next" is pressed by the operation of the manager, the management terminal 4 displays the confirmation screen 115 of the creation for the schedule data 109 shown in FIG. 15 on the display screen of the output unit 105.

For example, when the button "Next" is pressed and the confirmation button (not shown) is pressed by the operation of the manager, the management terminal 4 creates the schedule data 109, such as the firmware 99 of the first controller unit 21 (Controller 0 (ENC0)) is updated when the IOPS of the disk device 45 of the corresponding expander 73 is no more than 100, on the confirmation screen 115 shown in FIG. 15, and the corresponding schedule data 109 is transmitted to the disk array device 3.

Returning to FIG. 10, when it is instructed to update the firmware 99 from the management terminal 4 at the time of no more than the predetermined IOPS (YES in SP14), the ENC micro download control program 64 waits in the standby mode until the IOPS of the disk device 45 of the corresponding expander 73 is no more than the predetermined IOPS (SP15). When the disk device 45 of the corresponding expander 73 has no more than the predetermined IOPS (YES in SP15), the ENC micro download control program 64 proceeds to step SP18.

In this regard, when it is not instructed to update the firmware 99 from the management terminal 4 at the time of no more than the predetermined IOPS (NO in SP15), the ENC micro download control program 64 receives the schedule data 109, the ENC micro download control program 64 determines whether or not it is instructed to update the firmware 99 from the management terminal 4 when proceeding to the power saving mode (SP 16).

In this case, in FIG. 11, when the check button "when the power is turned off by the power saving function, the download is performed" is checked and the button "Next" is pressed by the operation of the manager, the management terminal 4 displays the creation screen 113 of the schedule data 109 shown in FIG. 13 on the display screen of the output unit 105.

Subsequently, for example, when the first controller unit 21 (Controller 0 (ENC0)) is selected and the button "Update" is pressed by the operation of the manager, the management terminal 4 displays the creation screen 114 of the schedule data 109 shown in FIG. 14 on the display screen of the output unit 105.

Subsequently, for example, when "working together with the power saving mode" is selected for "a download method in consideration of effect on performance" and the button "Schedule determination" is pressed by the operation of the manager, the manager terminal 4 determines the schedule of the first controller unit 21 (Controller 0 (ENC0)), and returning to the creation screen 113 shown in FIG. 13, so that the determined schedule of the first controller unit 21 (Controller 0 (ENC0)) is reflected on the creation screen 113 shown in FIG. 13.

On the other hand, in FIG. 13, for example, when neither controller unit nor enclosure is selected and the button "Next" is pressed by the operation of the manager, the management terminal 4 displays the confirmation screen 115 of the creation for the schedule data 109 shown in FIG. 15 on the display screen of the output unit 105.

For example, when the button "Next" is pressed and the confirmation button (not shown) is pressed by the operation of the manager, the management terminal 4 creates the schedule data 109, such as the firmware 99 of the first controller unit 21 (Controller 0 (ENC0)) is updated when the disk device 45 of the corresponding expander 73 proceeds to the power saving mode, on the confirmation screen 115 shown in FIG. 15, and the corresponding schedule data 109 is transmitted to the disk array device 3.

Returning to FIG. 10, when it is instructed to update the firmware 99 from the management terminal 4 at the time of the proceeding to the power saving mode (YES in SP16), the ENC micro download control program 64 waits in the standby mode until the disk device 45 of the corresponding expander 73 is in the power saving mode (SP17). When the disk device 45 of the corresponding expander 73 is in the power saving mode (YES in SP17), the ENC micro download control program 64 proceeds to step SP18.

In this regard, when it is instructed to update the firmware 99 from the management terminal 4 at a predetermined time (NO in SP17), the ENC micro download control program 64 proceeds to step SP19.

On the other hand, when steps SP11, SP13, SP15, and SP17 correspond to "YES", the ENC micro download control program 64 transmits the download data 110 to the corresponding expander 73 and instructs the expander 73 to update the firmware 99 necessary to initialize (SP18). Further, when it is instructed to update the firmware 99 at the time of the proceeding to the power saving mode, the ENC micro download control program 64 confirms through the power saving control program 66 that a spin-down of the corresponding disk device 45 is completed.

Subsequently, the ENC micro download control program 64 determines whether or not there are other expanders 73 in the schedule to update the firmware 99 (SP19).

When there are other expanders 73 in the schedule to update the firmware 99 (YES in SP19), the ENC micro download control program 64 returns to step SP12, and again determines whether or not it is instructed to update the firmware 99 from the management terminal 4 at a predetermined time (SP2) and repeatedly performs steps SP12 to SP19.

In this regard, when there are not other expanders 73 in the schedule to update the firmware 99 (NO in SP19), the ENC micro download control program 64 terminates the processing sequence RT2 of the firmware update instruction when the initialization is necessary shown in FIG. 10 (SP20).

Figure 16:
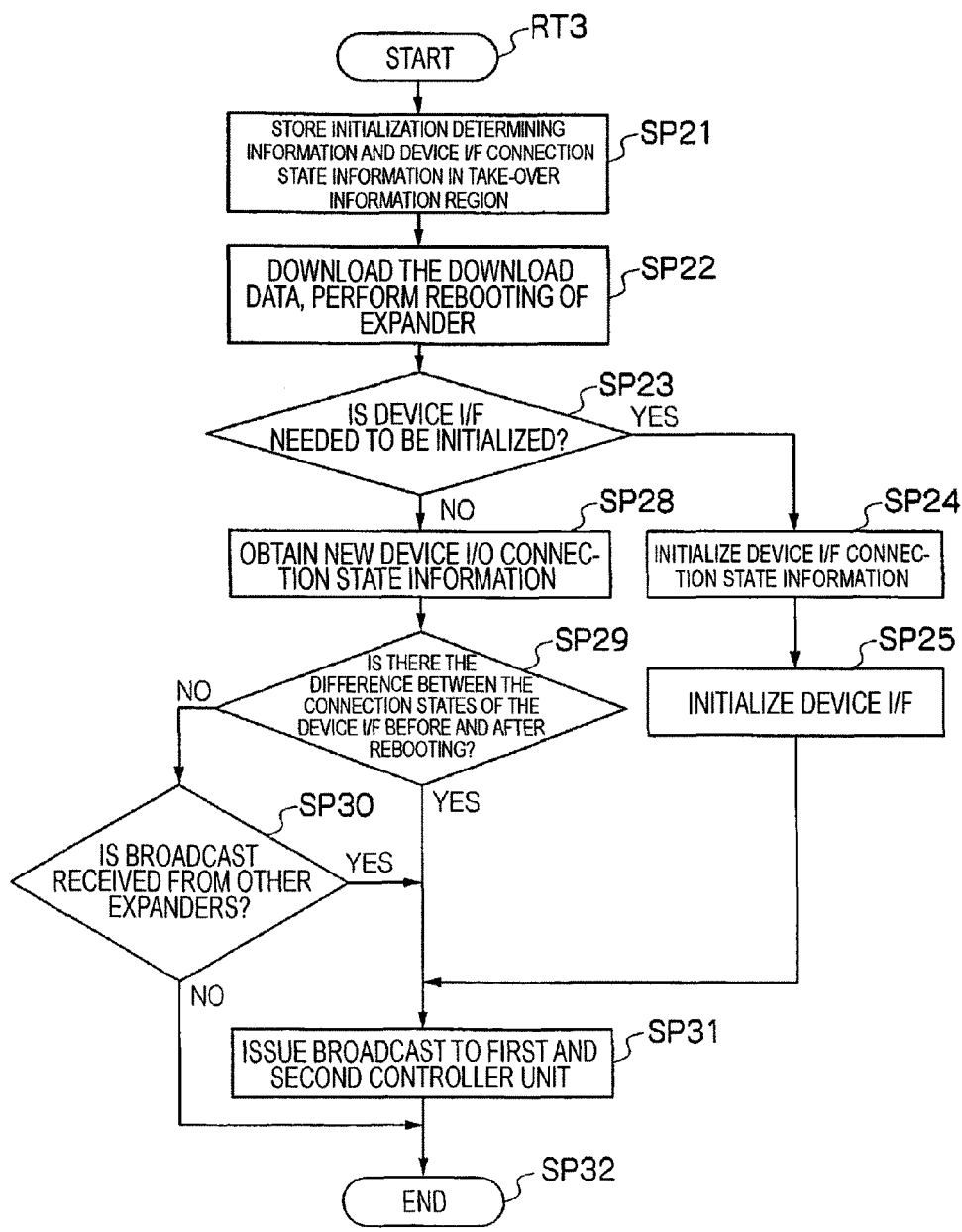
FIG. 16 is a flowchart illustrating a processing sequence of updating firmware.

FIG. 16 shows an example of flowchart illustrating the particular processing sequence of the processor 81 of the expander 73 of the disk array device 3 with respect to a process of a firmware update instruction of the expander 73 of the disk array device 3 in the s to rage system 1. Further, in the following descriptions, a process is expressed to be executed by a program as a subject of the sentence, but in actuality, the processor 81 performing the program carries out the process.

When receiving download data from the first controller unit 21 and the second controller unit 22 and receiving an instruction of updating the firmware 99, the control program 91 stores the initialization determining information 110C of the download data 110 and the device I/F connection state information 96 to the take-over information region 97 according to a processing sequence RT3 for updating the firmware shown in FIG. 16 (SP21).

Subsequently, the control program 91 downloads the download data 110 to the firmware 99 in the program storage region 98 so as to update the firmware 99, and reboots the expander 73 (SP22). Subsequently, the control program 91 determines whether or not it is necessary to initialize the device I/F 85 of the expander 73 with reference to the initialization determining information 110C stored in the take-over information region 97 (SP23).

When it is necessary to initialize the device I/F 85 of the expander 73 (YES in SP23), the control program 91 initializes the device I/F connection state information 96 stored in the memory 83 (SP24). Subsequently, the control program 91 initializes the switch unit 82 and of the each PHY 100 of the device I/F 85 (SP25).

In this regard, when it is unnecessary to initialize the device I/F 85 of the expander 73 (NO in SP23), a connection state of the device I/F 85 is newly obtained by the control program 91 and stored in the memory 83 (SP28). Subsequently, the control program 91 compares the device I/F connection state information 96 stored in the take-over information region 97 with the device I/F connection state information 96 newly stored in the memory 83 and determines whether or not there is the difference between the connection states of the device I/F before and after rebooting (SP29).

When there is no difference between the connection states of the device I/F before and after rebooting (NO in SP29), the control program 91 determines whether or not a broadcast command is received from another expander 73, for example, an expander 73 of the expanded chassis 12 which is lower level than the expander 73 of its own (SP 30). When the broadcast command is received from another expander 73 (YES in SP30), the control program 91 proceeds to step SP31. In this regard, when the broadcast command is not received from another expander 73 (NO in SP30), the control program 91 completes the processing sequence RT3 for updating the firmware shown in FIG. 16 (SP32).

On the other hand, after steps SP26 and SP27, or when steps SP29 and SP30 correspond to "YES", the control program 91 issues the broadcast command to the first controller unit 21 or the second controller unit 22 through the broadcast issue program 94 (SP31). The processing sequence RT3 for updating the firmware shown in FIG. 16 is completed (SP32).

Figure 17:
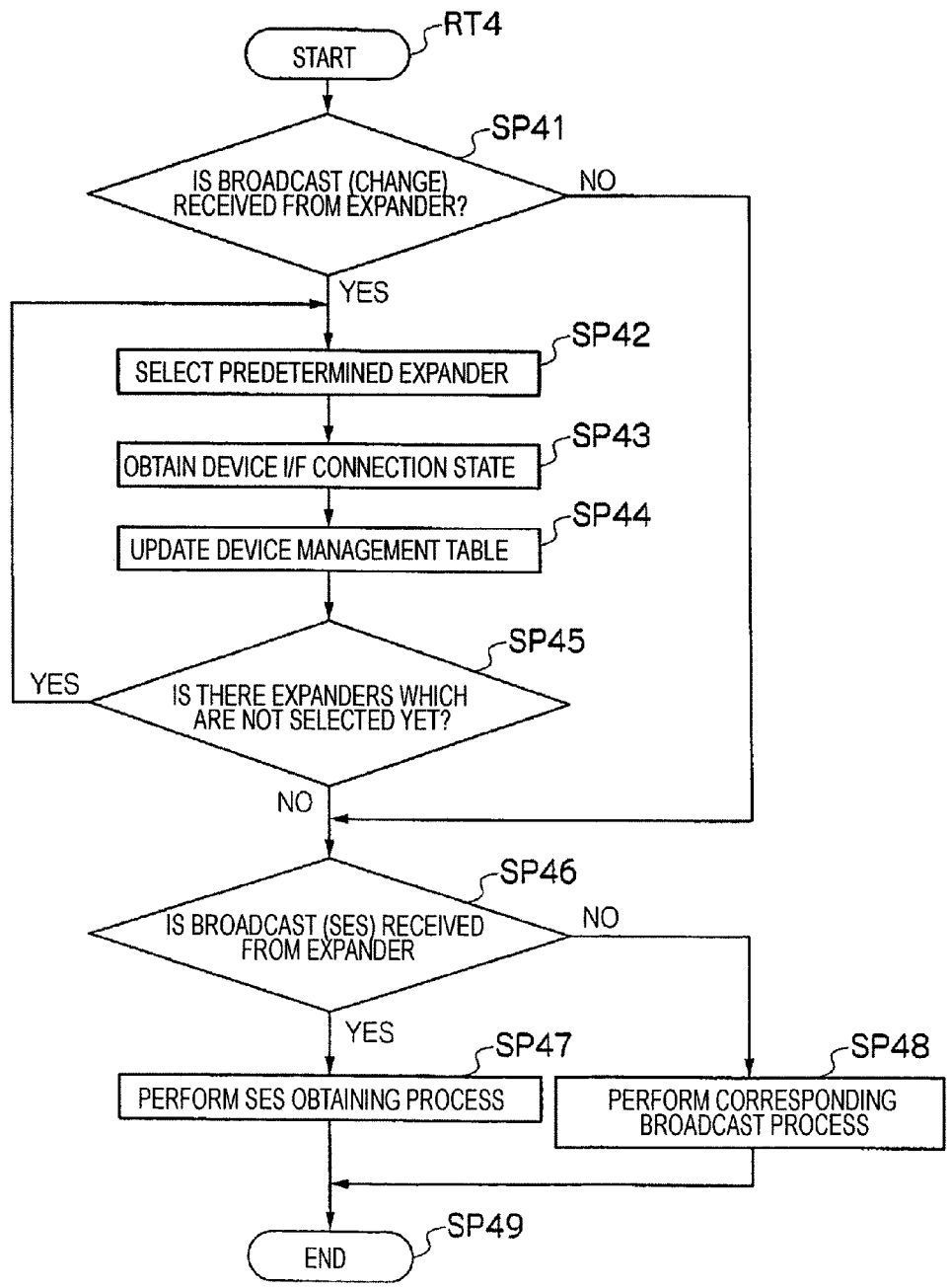
FIG. 17 is a flowchart illustrating a processing sequence when a broadcast command is received.

FIG. 17 shows an example of a flowchart illustrating a particular processing sequence of the CPU 51 of the disk array device 3 with respect to a process when the broadcast command of the disk array device 3 in the storage system 1 is received.

When the broadcast command is received from the expander 73 through the device command issue program 62, the device management program 65 classifies the type of broadcast command and determines whether or not a broadcast command (CHANGE) is received from the expander 73 according to a processing sequence RT4 at the time of receiving the broadcast command shown in FIG. 17 (SP41).

When the broadcast command (CHANGE) is received from the expander 73 (YES in SP41), the device management program 65 performs a discovery process through the discovery control program 70 and the PHY control program 71 (SP42~SP45).

That is, the device management program 65 selects a predetermined expander 73 (SP42) and obtains the connection state of the PHY 100 in the device I/F 85 of the corresponding expander 73 by the management command (SP43), so that the device management table 67 is updated (SP44).

Subsequently, the device management program 65 determines whether or not there are expanders which are not selected yet (SP45). When there are expanders which are not selected yet (YES in SP 45), the device management program 65 returns to step SP42 and again selects the predetermined expander 73, and then repeatedly performs steps SP42 to SP45.

In this regard, when there are expanders which are not selected yet (YES in SP45) or the broadcast (CHANGE) is not received from the expander 73 (NO in SP41), the device management program 65 determines whether or not a broadcast (SES) is received from the expander 73 (SP46). When the broadcast (SES) is received from the expander 73 (YES in SP46), the device management program 65 performs an SES obtaining process (SP47). In this regard, when the broadcast (SES) is not received from the expander 73 (NO in SP46), the device management program 65 performs a corresponding broadcast process (SP48).

Finally, the device management program 65 completes the processing sequence RT4 at the time of receiving the broadcast command shown in FIG. 17 (SP49).

As a result, in the storage system 1 according to the embodiment, when the download data 110 is received from the management terminal 4, it is determined whether or not a corresponding expander 73 is necessary to be initialized after the expander 73 downloads the download data 110; the determination result is transmitted to the management terminal 4; the download data 110 is transmitted to the corresponding expander 73 at a timing for updating the firmware 99 determined by the management terminal 4 on the basis of the determination result; and the corresponding expander 73 is instructed to be updated for the firmware 99.

Therefore, since the firmware 99 is able to be updated at a timing determined by the manager, it is possible to previously and effectively prevent that the transmission/reception of data is not performed temporarily, and the degradation of transmission/reception performance of data can be reduced. Thus, the speed of transmission/reception of data and reliability thereof are able to be increased.

Further, in the storage system 1, when it is determined that the expander 73 is unnecessary to be initialized and it is instructed to update the firmware 99 from the management terminal 4, the download data 110 is immediately transmitted to the corresponding expander 73 and the corresponding expander 73 is instructed to update the firmware 99. Therefore, since it is unnecessary to initialize the expander 73, the firmware 99 is able to be updated without temporarily stopping in transmission/reception of data.

Further, in the storage system 1, when it is determined that it is necessary to initialize the expander 73 and it is instructed to update the firmware 99 from the management terminal 4 at a predetermined time, the download data 110 is transmitted to the corresponding expander 73 at the predetermined time and the expander 73 is instructed to update the firmware 99. Therefore, it is possible to update the firmware 99 in a time zone when transmission/reception of data is inactive.

Further, in the storage system 1, when it is determined that the expander 73 is necessary to be initialized and it is instructed to update the firmware 99 from the management terminal 4 when the IOPS is no more than a specified IOPS, the download data 110 is transmitted to the corresponding expander 73 at the time of no more than the specified IOPS and the expander 73 is instructed to update the firmware 99. Therefore, the firmware 99 is able to be updated when transmission/reception of data is inactive.

Further, in the storage system 1, when it is determined that the expander 73 is necessary to be initialized and it is instructed to update the firmware 99 from the management terminal 4 when the disk device 45 proceeds to the power saving mode to the power saving mode, the download data 110 is transmitted to the corresponding expander 73 and the corresponding expander 73 is instructed to be updated for the firmware 99. Therefore, the firmware 99 is able to be updated when transmission/reception of data is stopped.

The present invention is widely applicable to a storage device which instructs an update of the firmware to the expander.

What is claimed is:

1. A method of instructing to update firmware using a plurality of expanders connected to a disk device in which data transmitted from a host device is stored and a controller unit for controlling the expanders, the method comprising:
a first step of determining whether or not, when download data is received from a predetermined terminal in order to update firmware of the expanders, it is necessary to initialize a corresponding expander after downloading the download data by the expander;

a second step of transmitting initialization determining information determined in the first step to the terminal; and a third step of transmitting the download data to the corresponding expander and instructing the corresponding expander to update the firmware at timing for updating the firmware, which is determined by the terminal based on the initialization determining information transmitted in the second step, and wherein, in the third step, upon a determination that it is necessary to initialize the corresponding expander in the first step and an instruction from the terminal to update the firmware when the expander transmits data to and receives data from the host device with a frequency equal to or lower than a predetermined frequency of transmission/reception of data, the download data is transmitted to the corresponding expander and the corresponding expander is instructed to update the firmware upon a frequency of transmission/reception of data being equal to or lower than the predetermined frequency.

2. The method of instructing to update firmware according to claim 1, wherein, in the third step, when it is determined in the first step that it is unnecessary to initialize the expander and it is instructed to update the firmware from the terminal, the download data is immediately transmitted to the corresponding expander and the corresponding expander is instructed to update the firmware.

3. The method of instructing to update firmware according to claim 1, wherein, in the third step, when it is determined in the first step that it is necessary to initialize the expander and it is instructed to immediately update the firmware from the terminal, the download data is immediately transmitted to the corresponding expander and the corresponding expander is instructed to update the firmware.

4. The method of instructing to update firmware according to claim 1, wherein, in the third step, when it is determined in the first step that it is necessary to initialize the expander and it is instructed to update the firmware from the terminal at a predetermined period of time, the download data is transmitted to the corresponding expander and the corresponding expander is instructed to update the firmware at the instructed period of time.

5. The method of instructing to update firmware according to claim 1, wherein, in the third step, when it is determined in the first step that it is necessary to initialize the expander and it is instructed to update the firmware from the terminal when power of the disk device connected to the expander is turned off, the download data is transmitted to the corresponding expander and the corresponding expander is instructed to update the firmware when power of the disk device is turned off.

6. The method of instructing to update firmware according to claim 1, further comprising:

a fourth step of informing the controller of a message indicating that there is a change in a connection state of the own expander before and after updating the firmware when it is determined in the first step that it is unnecessary to initialize the expander; and a fifth step of obtaining a connecting state of the expander and updating management information, in a case where it is informed that there is a change of the connection state in the fourth step.

7. A storage device comprising:

a plurality of expanders connected to a disk device which stores data transmitted from a host device; and a controller unit for controlling the expanders, wherein the controller includes a determination unit for determining whether or not, when download data is received from a predetermined terminal in order to update firmware of the expanders, it is necessary to initialize a corresponding expander after downloading the download data by the expander, a transmission unit for transmitting initialization determining information determined by the determination unit to the terminal, and an update instruction unit for transmitting the download data to the corresponding expander and instructing the corresponding expander to update the firmware at timing for updating the firmware, which is determined by the terminal based on the initialization determining information transmitted from the transmission unit, and wherein, upon the determination unit determining that it is necessary to initialize the corresponding expander and being instructed to update the firmware from the terminal when the expander transmits data to and receives data from the host device with a frequency equal to or lower than a predetermined frequency of transmission/ reception of data, the update instruction unit transmits the download data to the corresponding expander and instructs the corresponding expander to update the firmware upon a frequency of transmission/reception of data being equal to or lower than the predetermined frequency.

8. The storage device according to claim 7, wherein, when the determination unit determines that it is unnecessary to initialize the expander and it is instructed to update the firmware from the terminal, the update instruction unit immediately transmits the download data to the corresponding expander and instructs the corresponding expander to update the firmware.

9. The storage device according to claim 7, wherein, when the determination unit determines that it is necessary to initialize the expander and it is instructed to immediately update the firmware from the terminal, the update instruction unit immediately transmits the download data to the corresponding expander and instructs the corresponding expander to update the firmware.

10. The storage device according to the claim 7, wherein, when the determination unit determines that it is necessary to initialize the expander and it is instructed to update the firmware at a predetermined time from the terminal, the update instruction unit transmits the download data to the corresponding expander at the specified time and instructs the corresponding expander to update the firmware.

11. The storage device according to claim 7, wherein, when the determination unit determines that it is necessary to initialize the expander and it is instructed to update the firmware from the terminal when a power supply of the disk device connected to the expander is turned off, the update instruction unit transmits the download data to the corresponding expander and instructs the corresponding expander to update the firmware when the power supply of the disk device is turned off.

12. The storage device according to claim 7, wherein the expander includes a notification unit, which notifies the controller unit of a message indicating that there is a change in a connection state of the own expander before and after updating the firmware, when the determination unit determines that it is unnecessary to initialize the expander, and the controller unit obtains a connection state of the expander and updates management information in a case where the notification unit notifies the controller that there is a change in the connection state.

* * * * *